United States Patent [19]

Iyer et al.

[11] Patent Number: 5,082,876

[45] Date of Patent: Jan. 21, 1992

[54] COMPOSITIONS FOR FOUNDRY MOLDING PROCESSES UTILIZING RECLAIMED SAND

[75] Inventors: S. Raja Iyer, Naperville; Calvin K. Johnson, Lockport; Richard C. Cooke, North Riverside, all of Ill.

[73] Assignee: Borden, Inc., Columbus, Ohio

[21] Appl. No.: 568,630

[22] Filed: Aug. 16, 1990

Related U.S. Application Data

[63] Continuation of Ser. No. 179,391, Apr. 8, 1988, abandoned.

[51] Int. Cl.$^5$ ................................................. B22C 1/12
[52] U.S. Cl. ..................................... 523/145; 524/596
[58] Field of Search ........................ 523/145; 524/596

[56] References Cited

U.S. PATENT DOCUMENTS

| 2,981,652 | 4/1961 | Peterson . |
| 3,234,159 | 2/1966 | Cooper . |
| 3,300,205 | 1/1967 | Blaies, Jr. . |
| 3,306,864 | 2/1967 | Lang et al. . |
| 3,403,721 | 1/1968 | Robins . |
| 3,599,433 | 8/1971 | Murata . |
| 3,632,844 | 1/1972 | Robins . |
| 3,639,658 | 2/1972 | Soldatos . |
| 3,642,503 | 2/1972 | Beaney . |
| 3,690,979 | 9/1972 | Jarvi . |
| 3,696,622 | 10/1972 | Tohma . |
| 3,720,642 | 3/1973 | Junger . |
| 3,878,021 | 4/1974 | Tiedman . |
| 3,880,694 | 4/1975 | Freeman . |
| 3,905,934 | 9/1975 | Gardikes . |
| 3,920,460 | 11/1975 | Boston et al. . |
| 3,949,149 | 4/1976 | Cherubim . |
| 4,033,910 | 7/1977 | Papa . |
| 4,111,253 | 9/1978 | Epstein et al. . |
| 4,175,065 | 11/1979 | Andersson . |
| 4,215,012 | 7/1980 | Kho . |
| 4,240,948 | 12/1980 | Huck . |
| 4,256,623 | 3/1981 | Junger . |
| 4,283,319 | 8/1981 | Konii et al. . |
| 4,426,467 | 1/1984 | Quist et al. . |
| 4,468,359 | 8/1984 | Lemon et al. . |
| 4,474,904 | 10/1984 | Lemon et al. . |
| 4,597,991 | 7/1986 | Graham . |
| 4,780,489 | 10/1988 | Dunnavant et al. . |
| 4,789,693 | 12/1988 | Jhaveri et al. . |

FOREIGN PATENT DOCUMENTS

| 0027333 | 4/1981 | European Pat. Off. . |
| 0094165 | 11/1983 | European Pat. Off. . |
| 0085512 | 3/1985 | European Pat. Off. . |
| 0146499 | 6/1985 | European Pat. Off. . |
| 0189258 | 7/1986 | European Pat. Off. . |
| 1065605 | 9/1959 | Fed. Rep. of Germany . |
| 1171606 | 12/1964 | Fed. Rep. of Germany . |
| 1242358 | 9/1967 | Fed. Rep. of Germany . |
| 1252853 | 10/1967 | Fed. Rep. of Germany . |
| 1608038 | 1/1968 | Fed. Rep. of Germany . |
| 49-16793 | 2/1974 | Japan . |
| 50-130627 | 10/1975 | Japan . |
| 60-180904 | 6/1985 | Japan . |
| 62-283743 | 12/1987 | Japan . |
| 823269 | 4/1961 | United Kingdom . |
| 876033 | 8/1961 | United Kingdom . |
| 882058 | 11/1961 | United Kingdom . |
| 1190644 | 5/1970 | United Kingdom . |
| 1411975 | 10/1975 | United Kingdom . |
| 2050400A | 1/1981 | United Kingdom . |
| 2059972A | 4/1981 | United Kingdom . |
| 2059972B | 4/1981 | United Kingdom . |
| 2154593A | 9/1985 | United Kingdom . |
| 2159163A | 11/1985 | United Kingdom . |
| 2177408A | 1/1987 | United Kingdom . |

OTHER PUBLICATIONS

Union Carbide Bulletin "Union Carbide Silanes as Additives for Foundry Resins" (Apr., 1968) pp. 1–5.
FENOTEC Sand Binder System Bulletin, Foseco Foundry Svs. Ltd.
FOSECO Product Data Sheet, Foseco Foundry Services Ltd.
Betaset Process Introduction, Borden.
The Betaset Process for the Rapid Production of Moulds and Cores Article, Lemon et al.
ECOLOTEC Publication, Foseco Foundry Services, Ltc.
Experiences of Reclaiming 'Alphaset' Bonded Sand, S.C.R.A.T.A. Article, Stevenson, 1985.
Organofunctional Silane A-1106 Product Info. Publication, Union Carbide.
Organofunctional Silane A-1100 Product Information Pub., Union Carbide.
Molecular Weight of Distribution Measurements of Phenolic Resins Publication, Gardiner et al. (1966).
Molecular Weight of Phenolic Resins Publication, Ishida (1982).
Molecular Weight Characterization of Resole Phenol--Formaldehyde Resins Publication, Tobiason et al (1975).

Primary Examiner—Kriellion S. Morgan
Assistant Examiner—Yong S. Lee
Attorney, Agent, or Firm—Venable, Baetjer, Howard & Civiletti

[57] ABSTRACT

The present invention provides a binder solution having a low solids level which provides improved tensile properties when used with reclaimed sand. This binder solution comprises an alkaline phenolic resin which is cured at ambient temperature with an ester-functional curing agent. Also provided by this invention are raw batch formulations comprising sand, a binder solution having a low solids level, and a curing agent. These raw batch formulations include embodiments wherein the low solids levels are obtained by the separate addition of a solvent. The methods for producing foundry molds and cores of this invention included those procedures wherein dilution water is used to reduce the solids contents of conventional, relatively high solids content binder solutions.

37 Claims, No Drawings

COMPOSITIONS FOR FOUNDRY MOLDING PROCESSES UTILIZING RECLAIMED SAND

This application is a continuation of application Ser. No. 179,391, filed Apr. 8, 1988 now abandoned.

FIELD OF THE INVENTION

This invention relates to the manufacture of articles such as foundry molds and cores made from sand that is mixed with an alkaline phenolic resin binder, where the sand comprises a high level of reclaimed sand. More particularly, a portion of this invention relates to novel binders solutions for use with reclaimed sand, which binder solutions provide higher tensile strengths for articles produced therefrom.

RELATED APPLICATION

This application is closely related to a companion, copending application, Ser. No. 179,392, filed Apr. 8, 1988, now abandoned which also is concerned with the effective reuse of used, reclaimed foundry sand. That companion application treats reclaimed sand with a silane solution, to improve the tensile strengths of articles made from the sand with resin binders used in the foundry. It is incorporated herein by reference.

BACKGROUND OF THE INVENTION

In the manufacture of foundry molds and cores from sand using a curable binder, recycling the sand is an important economic consideration. Foundry sand can normally be used, then reused, repeatedly, when most resin binders are used. Normally there is a small loss of sand on reuse, and this loss is made up by adding pristine sand to the used sand. These conditions are experienced with most resin binders.

In recent years, however, ester cured alkaline phenolic resins have gone into widespread use. These resins can be ester cured at ambient temperature. Such resin binder systems are disclosed, for example, in U.S. Pat. Nos.: 4,426,467, in which lactones are used as the curing agents; 4,474,904, in which esters are so used; and 4,468,359, in which the esters are in the gaseous or vapor phase.

While these binding systems offer many advantages, there are offsetting disadvantages that are sometimes observed. For example when the sand is reused, the tensile strength of the molds or cores drops off. This may have a serious effect on the economics of the foundry.

The extent to which previously used sand is able to be reused is often determined by the tensile properties that can be achieved. One factor which determines the tensile strength is the ability of the binder to bond to the surfaces of the reclaimed sand. Higher rebonding strengths allow higher usage levels of reclaimed sand.

Sand reclamation is the physical, chemical or thermal treatment of a refractory aggregate to allow its reuse. Ideally there is no significant loss of its original useful properties as required for the application involved.

In typical foundry operations, the sand is collected after taking out a casting from a poured mold. This sand comprises loose sand grains, sand agglomerates and lumps of bonded sand. All these are broken down by mechanical devices into free-flowing granules. These granules are screened to produce reclaimed sand, ready for reuse. This is the simplest form of sand reclamation. The reclaimed sand from this process generally has layers of burned and partially burned binder films still adhering to it. The amount of such organic layer present can be determined by a loss-on-ignition (L.O.I.) determination.

The granular sand can be further processed to remove the binder residue layer either by mechanical means (sand scrubbers) or thermal means (a rotary kiln). The reclaimed sand that has been subjected to these additional processes is characterized by low LOI values as compared to the simple granular sand described above, as it comes from a used mold or core.

Pristine foundry sand would normally have negligible LOI and a particular, specified screen distribution (AFS Handbook). Ideal reclamation would return used sand to its original LOI and screen distribution values.

There are thus three treatments available for reclaiming sand. These include mechanical, wet, and thermal treatment processes. The mechanical treatment process typically involve subjecting the sand granules to grinding, scrubbing or other means of mechanical attrition to provide particles of a desired size, remove binder residues, provide new sand surfaces and/or remove fines. The equipment and process used may depend on the particle size and uniformity desired. The wet treatment processes involve washing the sand granules with water, draining the wash water and drying the washed sand. In thermal treatment processes, the sand is heated to a temperature of about 120° C. or above, wherein the binder residue is decomposed or burned.

The mechanical treatment processes and thermal treatment processes have not proven very effective in enhancing the bonding properties of reclaimed sand obtained from foundry cores and molds wherein the binder is an ester cured alkaline phenolic resin. Such sand is characterized by binder film residues on the sand surfaces, whose presence is indicated by many resulting properties, including a residual alkalinity. These residues may be the cause of the poor bonding characteristics of the reclaimed sand when reused with an ester cured alkaline phenolic resin binder. Wet treatment processes have been found to increase the bonding strength of such reclaimed sand, but are expensive, consume energy, and entail a disposal problem. It is believed the wet treatment processes "cleanse" the surface of the sand of at least some harmful residues, whereas the mechanical and thermal treatment processes are not as effective.

Most foundries utilize a simple mechanical treatment in reclaiming sand, and avoid the environmental problems of wet treatment and the expenditures of energy required for thermal treatment. These foundries compensate for the loss in bonding properties by mixing the reclaimed sand with pristine sand. The usage level of mechanically treated, thermally treated or untreated reclaimed sand may only be- about 50 weight percent of the total sand used. There is an economic incentive, as well as environmental and other incentives, to enhance the usage level of such reclaimed sand.

In comparison, sand recovered from foundry molds and cores which employ an acid cured binder, such as acid cured phenolic resins, acid cured furan resin, and phenolic-urethane resins, generally show no significant loss in bonding strength after thermal or mechanical treatment, as compared to pristine sand. When reclaimed sand shows no loss in bonding ability, generally its reuse can be as high as 80% to 90% by weight of the total sand used. Theoretically, the usage level of such reclaimed sand can be as high as 100%; however, there are usually losses in foundry operations due to spillage and other handling losses. Therefore, it is necessary to replenish the stock of sand with pristine sand.

It is desirable to enhance the bonding affinity and ability of used sand, reclaimed from foundry use, that has been bonded with an ester cured alkaline phenolic resin, particularly a highly alkaline phenolic resin, to the extent that usage levels of such reclaimed sand may be as high as 60% to 80% or 90% by weight in subsequent foundry operations.

Solutions of alkaline phenolic resins that are curable with curing agents having ester functionality have been disclosed in U.S. Pat. Nos. 4,426,467, 4,468,359 and 4,474,904, as mentioned above. In U.S. Pat. No. 4,426,467, the curing agents are lactones, which are self condensed cyclic esters, and the resin binder solutions have preferred solids contents in the range from 80% to 95% by weight. Suitable solids concentrations are said to be in the range from 60% to 95% by weight. The solutions of curable resin binders disclosed in U.S. Pat. Nos. 4,468,359 and 4,474,904 have solids contents falling within the range of 50% to 75% by weight. These three U.S. Patents are expressly incorporated herein by reference.

Resin solutions with lower solids contents in the range from 40% to 70% by weight have been disclosed in Japanese Laid Open Patent Application No. 62-282743, assigned to Dainippon Ink. However, the resin solids in these solutions are augmented with added resin solids prior to use. These added resin solids are dissolved in the organic ester curing agent in an amount of from 20% to 60% by weight, based on the weight of the ester.

It is recognized in the art that the tensile strengths of the finished products suffer when the solids content of the binder solution falls below about 50% by weight, when used with pristine sand.

SUMMARY OF THE INVENTION

It has now been discovered that solutions of alkaline phenolic resins with solids in the range from about 33% to about 47% provide superior bonding properties for used, reclaimed sand, when compared to those obtained by the use of similar resin binder solutions at conventional, higher solids contents, and that said lower solids content resin solutions achieve higher tensile strengths for resin-bonded sand articles such as foundry molds or cores made from reclaimed sand.

U.S. Pat. Nos. 4,474,904, 4,468,359, and 4,426,467 specified several features of their respective resin binders that were deemed necessary for their successful usage in the foundry, including relatively high solids contents, i.e., above 50%.

The present invention resides in the use of solutions of alkaline phenolic resin binders, that are curable by curing agents having ester functionality, for binding sand of which at least 40% by weight, and preferably from 50% to 100% by weight, and more preferably at least 60% to about 80% by weight, comprises reclaimed used sand, such as sand that has been recovered from dismantled foundry molds or cores, and reclaimed. The invention is useful for used sand that has been reclaimed and has "residual alkalinity", as described below.

The resin binder solutions of this invention comprise from about 33% up to about 47% by weight solids, based on the weight of solution, preferably about 35% to about 45%, and most preferably, about 38% to 42%. That is, the resin binder solutions that are useful in the practice of this invention have solids contents of from about 33% to about 47%, and preferably, from about 35% to about 45%. The solids contents are determined by heating a 1.5 g sample at 135° C. for three hours, then determining weight of the remainder. The weight of the remainder is reported as the solids content. This procedure for determining the solids content was used for all such determinations reported in this application. The binder solutions of the invention generally have Brookfield viscosity values of from 15 cps to 150 cps, as determined utilizing a Model RVF Brookfield viscometer with a No. 1 spindle at 20 rpm and at 25° C. These solids comprise an alkaline phenolic resin that can cure at room temperature with a curing agent having ester functionality.

Also provided by this invention is a raw batch composition which comprises a binder solution, a curing agent, and sand in substantially uniform admixture. This raw batch composition is useful for forming sand aggregates such as foundry molds and cores. The sand used comprises at least 40% by weight sand which has been reclaimed from one or more mechanically dismantled foundry cores or molds. The "effective" solids content of the binder solution in the raw batch formulation is from about 33% to about 47% by weight, based on the weight of said solution. This "effective solids" content is achieved by the use of the binder solutions of the present invention or by the use of a more concentrated binder solution (i.e. one having a higher solids content than 33% up to 47%) with dilution water, when forming the raw batch formulation.

In addition, a process is provided for using the raw batch formulations of the present invention to form foundry molds or cores. In this process, a raw batch formulation, as described above, is shaped into the configuration desired. The binder is then allowed to cure. The phenolic resin may be an alkaline phenolic resin, in which case a curing agent with ester functionality will initiate curing under ambient conditions. Alternatively, if the phenolic resin is neutral or acidic, then the curing agent should be a mixture or solution having ester functionality and the ability to impart sufficient alkalinity to the resin upon admixture with it to bring about curing conditions. The embodiments of this process also include shaping a mixture of sand and binder solution, and gassing this mixture with an ester-functional curing agent in vapor or gaseous form, to cure the resin.

DETAILED DESCRIPTION OF THE PREFERRED EMBODIMENTS

The present invention relates in one preferred embodiment to the use of alkaline phenolic resin binders having relatively low solids contents, for forming foundry molds and cores from reclaimed sand.

The term "reclaimed sand" as used herein, refers to sand that has been formed into a resin-bonded shape with an alkaline resin binder, then recovered for reclamation and reuse in the form of free flowing sand granules. These free-flowing granules have residues of the alkaline binder that are adhered to their surfaces.

The invention was developed for use with used sand that had been previously bonded with an ester cured alkaline phenolic binder. Such previously bonded sand, when recovered for reclamation, can be used again as is with an ester curable alkaline phenolic resin binder, but the resin-bonded articles thus formed generally are characterized by tensile strengths that are lower than is desirable. This is believed to be caused by the presence, on the used sand grains, of a residue. This residue appears to consist of several different components, but the important one with respect to effect on tensile strength is believed to be an alkali silicate. If the alkaline phenolic resin binder previously used was a potassium phenolic resin, the residue would comprise potassium silicate. Other alkaline silicates are believed to be produced by other alkaline resins.

While the identity of the residues, which are believed to be on the surfaces of the sand grains, is not known with certainty, the present invention provides a practical means for using recovered used sand with an ester curable alkaline phenolic resin to form resin-bonded sand shapes having acceptable tensile strengths, despite the presence of such residue. The invention appears deceptively simple when known, but was not easy of development: it involves the use of ester curable alkaline phenolic resin binders in aqueous solutions at low solids contents, i.e., from about 33% to about 47%, and preferably from about 35% to about 45% by weight. For convenient reference hereafter, the recovered used sand to which the invention is applicable, is referred to as sand recovered from a shape previously bonded with an alkaline binder, or as sand granules having residual alkalinity, or as sand having on its surfaces a water-removable residue. It is also believed that at least a part of the residue on the surfaces of the sand is alkaline silicate material. Consequently the reclaimed sand could also be referred to as sand having on its surfaces reside comprising an alkaline silicate. These alternative expressions for referring to the reclaimed sand are apt because of uncertainty of the cause of the poor tensiles that are observed with recovered, previously alkaline-resin-bonded sand, although there is no uncertainty about the improvement in tensiles obtained through the use of the present invention.

Recovered used sand may be prepared for use in the practice of the invention by mechanical and thermal reclamation processes, as now known in the art. Such processes can be used to produce reclaimed sand granules of a size corresponding to a screen distribution of about 25–140, as defined in the American Foundrymen Society's Handbook, "Molds and Cores", pp. 4.2–4.5. A vibratory mill is typically the mechanical means used to form the free flowing sand granules following shake-out of the loose sand from a mold.

Foundry sand or other refractory materials used in the production of foundry molds and cores is generally silica sand, quartz, chromite sand, zircon sand, or olivine sand, and may be beach sand, lake sand, bank sand, but many other such materials could be used.

It is important to identify the source of the binder residues that are present on the reclaimed sand to determine which reclamation and subsequent use processes will provide the best results. Binder residues that appear to have a deleterious effect on the affinity of reclaimed sand for a phenolic resin binder in particular are those residues found on sand that has been used in a mold or core bonded by ester cured alkaline phenolic resins applied in an aqueous solution after metal casting. Such binders are often hardened with curing agents that have ester-functionality, which are referred to herein as "ester curing agents". Specific examples of "ester curing agents" are described more particularly below. Where these curing agents are used, the binder typically hardens and cures under ambient conditions.

The recovered used sand, with which the invention is concerned, is sand that has been previously bonded with a phenolic resin obtained by the reaction of a phenol such as phenol, cresols, resorcinol, 3,5-xylenol, bisphenol-A, other substituted phenols, or mixtures thereof, with aldehydes such as formaldehyde, acetaldehyde or furfuraldehyde. Preferred reactants are phenol and formaldehyde utilized in a molar ratio of phenol to formaldehyde in the range of about 1:1 to about 1:3 and more preferably 1:1.5 to 1:2.8.

Preferred alkaline materials used to condense these phenolic resins include sodium hydroxide, potassium hydroxide, lithium hydroxide, and mixtures thereof, with potassium hydroxide being the most preferred. A part of the alkaline material may be provided by substituting for a part of the alkali metal hydroxide a divalent metal hydroxide such as, for example, magnesium hydroxide and calcium hydroxide. The preferred alkaline phenolic resins have an alkali:phenol molar ratio in the range of 0.2:1 to 1.2:1.

The more commonly used alkaline phenolic resin binders will have a Brookfield viscosity of from 75 to 250 cps, at a concentration of 53% to 58% in water, utilizing a model RVF Brookfield viscometer with a No. 1 spindle at 20 rpm and at 25° C. The binder solutions of this invention have solids contents of about 33% to about 47% by weight, preferably by about 35% to 45% by weight, and most preferably, about 38% to about 42% by weight.

Suitable phenolic resins generally have a weight average molecular weight greater than about 500 and less than about 2500, more preferably greater than about 700, and most preferably within the range of about 700 to 2000, as determined by gel permeation chromatography (GPC). In the preferred GPC method, used herein, the resin sample is dissolved in tetrahydrofuran (THF), then neutralized with 1N hydrochloric acid. The salt thus formed is removed by filtration, and the filtered supernatant liquid resin solution is run on a GPC apparatus to determine Mw. The apparatus included a Waters model 6000A pump, a Waters model R401 differential refractive index detector, a Waters model 730 Data Module, PL Gel 30 am 10$\mu$ columns, porosities $10^4$, 500 and 50 Argstrom units, respectively, and a Rheodyne model 70-10 sample loop injector fitted with a 100 $\mu$l loop and a 0.5 $\mu$m in-line filter situated between the injector and the first column.

To determine Mw for an aqueous alkaline resole, the procedure is as follows.

Dissolve 1 g resin in 10 ml methanol. Adjust the pH to 7 on a buffered pH meter using 1N hydrocholoric acid. Ad 10 ml unstabilized THF and continue stirring to ensure all the resin is in solution. Allow any precipitated salt to settle and transfer 500 $\mu$l of the supernatent liquor to a 5 ml sample vial. Remove the solvent under vacuum for the minimum of time (about 5 mins) and at a temperature of 35° C. Add 1 ml mobile phase and filter.

Primary calibration of the columns is carried out using phenol and the oligomers formed by reaction of 2,4'-dihydroxy diphenyl methane with formaldehyde at a mol. ratio of 1–5:1 with sulphuric acid catalys and a temperature of 120° C. for 30 mins. This gives individual peaks for up to 8-ring compunds (m.wt. 850). Above this the calibration curve is extrapolated.

Once the columns are calibrated with primary standards, resins may be run and their weight average molecular weights obtained. One of these samples may be chosen as a secondary standard to check the day-to-day tie-up not only of retention times but of calculated molecular weight averages.

A standard resin solution should be injected each time the GPC system is started up and repeated until consistent retention times and molecular weights are obtained. If the calibration is satisfactory then samples may be run. If the results are consistent but vary from those expected, and there are no leaks or trapped air bubbles in the system, then the columns should be recalibrated with primary standards.

Some of the preferred phenolic resins used in the binder solution of this invention are the highly alkaline phenolic resins such as those described in U.S. Pat. Nos. 4,474,904 and 4,468,359. It is noted that in these patents, the alkalinity content of the resins is expressed in terms of the molar ratio of potassium hydroxide to phenol and that potassium hydroxide is described as the most preferred alkali. The molar ratio of KOH:phenol for the preferred potassium alkaline resins for use in the practice of this invention falls in the range of about 0.2:1 to about 1.2:1.

The binder solution useful in the practice of this invention preferably is an aqueous solution of an alkaline phenol formaldehyde resin wherein i) the solids content is in the range from about 33% to about 47%, preferably 35% to 45%, and more preferably 38% to 42%, (ii) the weight average molecular weight (Mw) is from 500 to 2500, preferably 700 to 2000, and more preferably 800 to 1700, (iii) the formaldehyde:phenol molar ratio is from 1:1 to 3:1, preferably 1.2:; to 2.6:1, (iv) the alkali:phenol molar ratio is from 0.2:1 to 1.2:1, preferably 0.6:1 to 1.2:1, (v) the alkali used comprises sodium hydroxide, potassium hydroxide, and their mixtures, (vi) said solution may optionally contian a silane to the extent of 0.05% to 3.0% by weight of said aqueous resin solution, and (vii) said resin is curable at room temperature with $C_1-C_3$ alkyl formates, organic esters formed from $C_1-C_{10}$ carboxylic acids and mono- and polyhydric alcohols and low molecular weight lactones including butyrolactone, propiolactone, caprolactone, and mixtures thereof.

However, the phenolic resin may also be an acidic or neutral resin, the aqueous solution of which is made alkaline either before or at the same time that the ester-functional curing agent is added to the resin solution. Otherwise, the parameter values i) through (iii) and (vi) through (vii) apply, and after addition of the source of alkalinity to the resin, the parameter values (iv) and (v) also apply, for the more preferred embodiments.

Where the binder solution includes a silane, added for the purpose of improving the tensile strength of the molds or cores produced therefrom, the silane concentration may be as low as 0.05% by weight, based on the weight of the binder solution. Higher concentrations of silane provide greater improvements in strength up to quantities of about 0.6% by weight, based on the weight of the binder solution. The use of silane concentrations at higher levels, while useful, is not preferred because of the added cost. In addition, because one preferred silane often used is an aminoalkyl alkoxy silane, which contains nitrogen, the use of excess silane may increase the risk of pinhole defects in the casting and for this reason, amounts in excess of 3% by weight, based on the weight of binder solution, are not used.

A silane, if used, is generally effective in increasing the tensile strength of the foundry mold or core product. Suitable silanes include those conforming to the formula $R'Si(OR)_n$, wherein $R'$ is a $C_2-C_6$ alkylene group, bonded to an amino, epoxy, mercapto, glycidoxy, ureido, hydroxy, hydroxy-$C_1-C_6$, alkyl amino, amino-$C_1-C_6$ alkyl amino, $C_2-C_6$ alkenyl or $C_2-C_6$ alkenyl-carboxy group, and the groups R may be the same or different and are selected from $C_1-C_6$ alkyl and $C_1-C_6$ alkoxy substituted $C_1-C_6$ alkyl groups.

Also included are those aminoalkyl alkoxy silanes which conform to the general formula

$$H_2N(CH_2)_nSi(OR^1)_{3-x}(R^2)_x,$$

wherein n equals a whole number of from 2–4, $R^1$ is an alkyl group of from 1-4 carbon atoms and phenyl, $R^2$ is an alkyl group of 1-4 carbon atoms and x is 0 or 1. Specific examples of such silanes which conformed to either or the above formulas include:
gamma-aminopropyl trimethoxysilane,
gamma-aminopropyl triethoxysilane (Silane A-1100)
gamma-aminobutyl triethoxysilane,
gamma-aminopentyl triethoxysilane,
gamma-aminopropyl diethoxymethylsilane,
gamma-aminopropyl diethoxyethylsilane,
gamma-aminopropyl diethoxyphenylsilane,
delta-aminobutyl diethoxyphenylsilane,
delta-aminobutyl diethoxymethylsilane, and
delta-aminobutyl diethoxyethylsilane.

The alkaline phenolic resin binder solutions that are useful in the practice of this invention are curable with ester curing agents. Those which are preferred include lactones, organic carbonates, carboxylic acid esters, and mixtures thereof. These species exhibit the ester functionality necessary for "ester cure" of the phenolic resin.

Generally, low molecular weight lactones are suitable, such as gamma-butyrolactone, valerolactone, caprolactone, beta-propiolactone, beta-butyrolactone, beta-isobutyrolactone, beta-isopentylactone, gamma-isopentylactone and delta-pentylactone. Carboxylic acid esters which are suitable include those of short and medium chain length, i.e., about $C_1$ to $C_{10}$, alkyl mono or polyhydric alcohols with short or medium length, i.e., $C_1$ to $C_{10}$ carboxylic acids. Specific carboxylic acid esters include, but are not limited to, n-butyl acetate, ethylene glycol diacetate, triacetin (glycerol triacetate), dimethyl glutarate, and dimethyl adipate.

Of the organic carbonates, those which are suitable include, but are not limited to, propylene carbonate, ethylene glycol carbonate, glycerol carbonate, 1,2-butanediol carbonate, 1,3-butanediol carbonate, 1,2-pentanediol carbonate and 1,3-pentadiol carbonate.

The binder may also be cured by gassing with an ester functional curing agent such as a low molecular weight carboxylic acid ester, preferably one of the $C_1$ to $C_3$ alkyl formates, including methyl formate and ethyl formate. The gassing curing agent is preferably dispersed in a carrier gas as a vapor or an aerosol. This carrier gas must be inert in that it should not react with the alkyl formate curing agent or have an adverse effect on the curing reaction or other property of the product. Suitable carrier gas examples include air and nitrogen.

The relative volatility of the alkyl formates facilitate their use as gassing curing agents. This is especially true of methyl formate which is a volatile liquid having a boiling point at atmospheric pressure of about 31.5° C.

At ambient temperatures, it is sufficiently volatile that passing a carrier gas through the liquid methyl formate gives a concentrated methyl formate vapor. Ethyl and propyl formates are less volatile than the methyl ester, having boiling points in the range of 54° C. to 82° C. at atmospheric pressure.

The concentration of formate ester in the carrier gas is preferably at least 0.2% by volume. The total amount of alkyl formate used will typically be from about 10% to 110%, preferably from 15% to 35% by weight of the phenolic resin solution. The time required for adequate gassing depends on the size and complexity of the core or mold and on the particular resin used. It can be as short as 0.1 seconds but more usually is in the range of 1 second to 1 minute. The gassing procedures are described more particularly in U.S. Pat. No. 4,468,359.

The binder solutions of this invention are particularly suited for bonding reclaimed sand. Reclaimed sand is distinguished from new or pristine sand in that it has been recovered from a dismantled foundry mold or core following use in a metal casting process. It is the heat experienced during the metal casting which is believed to generate the binder residues that are believed to be responsible for reducing the tensiles of resin-bonded shapes made from the reclaimed sand with ester curable alkaline phenolic resin binders, and that may be the source of residual alkalinity.

RAW BATCH FORMULATION

Also within the scope of this invention are raw batch formulations comprising a binder solution, sand, and a curing agent. At least 40% by weight of the sand used is reclaimed sand, generally 50% to 100%, and preferably 60% or more. Suitable reclaimed sand and other components for the raw batch formulation are those described above.

Thus the binder solution in these raw batch formulations preferably comprises a highly alkaline phenolic resin in solution, applied in an amount sufficient to bind the sand with the adhesive bonding necessary for use in making a foundry mold or core. The quantity of the binder solution is typically in the range of from about 0.5% to 8% by weight of resin solution, based on the weight of the sand utilized, when the solids content of the resin solution is from about 33% up to about 47%. Preferred quantities of the binder solution generally fall below about 2% by weight of the sand used.

The third component of these raw batch formulations is a curing agent selected from the group consisting of lactones, carboxylic acid esters, organic carbonates and mixtures thereof, which cure the binder at ambient temperature. The curing agent is present in an amount sufficient to cure said binder, with preferred concentrations of curing agent falling within the range of about 10% to 110% by weight, based on the weight of binder solution.

The raw batch formulation may be formed by combining and mixing these components to provide a substantially uniform mixture. This can be achieved with simple lab batch mixers, high speed continuous mixers or other conventional equipment. Alternatively, the sand and binder solution may be mixed and formed into a desired shape, and the curing agent introduced in gaseous or vapor form. When the raw batch formulation is completed by gassing a mixture of sand and curable binder with a curing agent, the curing agent is preferably a $C_1$–$C_3$ alkyl formate, used in the quantity of about 10% to 110% by weight, based on the weight of curable binder solution.

The binder solution in the raw batch formulation has an "effective" solids content of from about 33% to about 47% by weight, based on the total weight of the binder solution therein plus any solvent that is added to the raw batch formulation which dilutes the binder solution. Suitable solvents may be water or an organic solvent which is soluble in water, such as methanol, ethanol, a glycol, furfuryl alcohol, mixtures of these, and the like.

This "effective" solids concentration for the binder solution can be achieved by utilizing a low solids binder solution or by utilizing a high solids binder solution in combination with a separate solvent that is added and which will reduce the solids content of the binder solution. Once the dilution solvent and binder solution are added to the sand and mixed, an "effective" solids content of about 33% to about 47% will be realized, and an improvement in bonding properties will be realized over raw batch formulations containing reclaimed sand and binder solutions at conventional solids contents of above 50% by weight.

Process for Producing Foundry Cores and Molds, Making Effective Use of Reclaimed Sand A raw batch formulation as described above is prepared by combining and mixing sand, a binder solution and curing agent. A dilution solvent can also be introduced so as to provide the necessary "effective" solids content for the binder solution in the raw batch formulation.

The raw batch formulation is then formed into a desired shape prior to curing. To form the desired shape, all the components of the raw batch formulation, i.e., sand, binder solution and curing agent, can be mixed and subsequently shaped. Alternatively, the sand and binder solution can be mixed, shaped, and subsequently gassed with an ester functional curing agent. The binder hardens and cures at ambient conditions.

EXAMPLES

This invention will now be demonstrated by the following examples. In these examples, and elsewhere throughout the specification, all parts and proportions are by weight, and all temperatures are in degrees Celsius, unless expressly indicated otherwise.

EXAMPLE 1

Preparation of Binder Solutions With Low Solids Contents

In this example, binder solutions for evaluation are prepared from a commercially available ester curable alkaline phenolic resin binder solution, ALpHASET 9000 resin, sold by Borden, Inc. This binder solution is referred to in these examples as the "Standard Resin 1."

Resin solutions A through E, prepared from Standard Resin 1 by dilution, have different solids contents that are useful in the practice of the present invention. Control Resin 1 is a binder solution having a 30.2% solids content, that is below the useful range prescribed for the practice of this invention.

The ALpHASET 9000 resin binder solution used (Standard Resin 1) had a solids content of about 54% by weight. This resin is obtained by the reaction of phenol and formaldehyde at a phenol:formaldehyde molar ratio of about 1:1.8. The potassium hydroxide:phenol molar ratio for this resin is about 0.85:1. The resin solution contains gamma-aminopropyl triethoxy silane in the amount of about 0.4% by weight, based on the weight of the resin solution. The Brookfield viscosity of this resin solution fell within the range of about 100 to 150 cps, as determined by a Model RVF Brookfield viscometer with a No. 1 spindle, at 20 rpm and at 25° C.

The quantities of Standard Resin 1 and water used to produce the binder solutions of Resin solutions A through E and Control Resin 1, respectively, are indicated below in Table 1, along with the resultant solids contents, all determined by the method described above. To make Resin C, Standard Resin 1 was further diluted with 5.3% by weight, based on the total weight of the binder solution, of a 40% solution in water of gamma-aminopropyl triethoxy silane, to achieve a final water content of 21.1%.

TABLE 1

DILUTION OF STANDARD RESIN 1

| | Standard Resin 1 (wt % percent) | Dilution Water (wt percent) | % Solids Content |
|---|---|---|---|
| Standard Resin 1 | 100 | 0 | 54 |
| Resin A | 78.9 | 21.1 | 42.5 |
| Resin B | 83.4 | 16.6 | 45.6 |
| Resin C | 78.9 | 21.1* | 46 |
| Resin D | 77 | 23 | 41.3 |
| Resin E | 70 | 30 | 37.6 |
| Control Resin 1 | 56 | 44 | 30.2 |

*Solution contains 5.3 wt. % of a 40% solution of gamma-aminopropyl triethoxy silane.

These resin solutions are used in subsequent examples to produce test cores.

EXAMPLE 2

Preparation of Additional Binder Solutions With Low Solids Contents

In this example, a binder solution for evaluation was prepared from a different commercially available ester curable alkaline phenolic resin binder solution, BETA-SET 9500, sold by Borden, Inc. This resin was prepared by the reaction of phenol and formaldehyde at a molar ratio of about 1:2 and at a potassium hydroxide:phenol molar ratio for this resin of about 0.8:1. This resin binder solution contains gamma- aminopropyl triethoxy silane in the amount of about 0.4% by weight. The Brookfield viscosity of this resin binder solution fell within the range of about 75-100 cps as determined by the method described in Example 1. This binder solution had a solids conent of about 57%, and is referred to as "Standard Resin 2."

Resin F, prepared by dilution from Standard Resin 2, represents a binder solution within the scope of this invention. Resin F was prepared to contain 77.7 weight percent of Standard Resin 2 solution and 22.3 weight percent added water. The solids content for Resin F was 44.3%.

Both Resin F and Standard Resin 2 were used in the preparation of test cores in subsequent examples to illustrate some of the preferred embodiments of this invention.

EXAMPLE 3

Preparation of a Binder Solution with a Low Solids Content where the Resin is Condensed with Mixed Alkalis of Sodium and Potassium In this example, the binder solution was prepared as follows. About 27.3 parts by weight phenol was weighed in a three necked flask fitted with a stirrer, thermometer and condenser. To this three necked flask were added about 14.9 parts by weight of a 50% sodium hydroxide solution in water. The contents were mixed and following the addition of the sodium hydroxide, about 34.9 parts by weight of a 50% formaldehyde solution in water were added over a period of time at 65° C. Once all the formaldehyde was added, the temperature was raised to about 92° C. until the viscosity reached 800 cps to 1000 cps. The temperature was then reduced to about 72° C. to 74° C. and the mixture was reacted further until a viscosity of about 8000 cps to 9000 cps was obtained.

After this viscosity was obtained, the resin solution was cooled, and about 14.4 parts of water, 3.8 parts by weight ethanol, and 2 parts by weight of a 50% potassium hydroxide solution in water were added and mixed. While the solution was cooling, about 0.8% by weight of Silane A-1100 was added. This finished binder solution had a viscosity of about 163 cps, as determined by the method used in Example 1, a solids content of 51% and a gel time of about 9 minutes 40 seconds. This binder solution is identified in the Examples herein as "Control Resin 2".

Resin G was prepared by diluting Control Resin 2 to form a binder solution within the scope of this invention. Resin G was comprised of about 80% by weight of Control Resin 2 and 20% by weight of added water, and had a solids content of 37.3% by weight.

EXAMPLE 4

Preparation of Test Cores with Reclaimed Sand

This example demonstrates the use of low solids contents binder solutions of the present invention in forming test cores with reclaimed sand, and compares the tensile strengths of these test cores to those obtained using similar resin binder solutions having more customary solids content.

In preparing the test cores, a quantity of sand of about 1500 to 2500 gms was added to a Hobart Kitchen Aid Mixer for each Test and Control described below. The sand was brought to a temperature of about 25° C. and about 1.5% by weight of a binder solution, based on sand weight, was added to the sand and mixed in for about one minute. The binder solution and sand which were utilized in each Test and Control are described more particularly below.

After the mixing in the binder solution, about 25% by weight triacetin curing agent, based on the weight of binder solution used, was added and mixed in for another 40 seconds.

After mixing, the raw batch formulation thus produced was used immediately to form standard American Foundrymen Society's 1-inch dogbone tensile briquettes in a Dietert 696 corebox. The cores were cured at room temperature and the samples were broken at the following approximate intervals: one hour, two hours, four hours, and twenty-four ours, after the cores were made. Tensile strength measurements were made using a Dietert Universal Sand Strength Machine 400-1, fitted with a Tensile Core Strength Accessory 610-N. Average values for about 3 to 4 tensile strength measurements were determined.

The reclaimed sand used in this example was recovered from foundry molds and cores that had been used in casting iron or steel. The reclaimed sand contained a binder residue derived from an ALpHASET 9000 resin that had been cured with triacetin curing agent. The foundry molds or cores, from which the reclaimed sand was obtained, were dismantled after use in a metal casting process by vibrating the mold or core to loosen sand and break up any large lumps with a vibratory mill. The free-flowing sand granules obtained were subjected to dry attrition in a unit produced by Redford Carver Foundry Products, Sherwood, Oregon. The sand obtained had particle sizes corresponding to an American Foundrymen's Society's screen distribution of about 48.7 Grain Fineness and a loss on ignition value (LOI) of 0.80.

To illustrate the processes of this invention, test cores were made utilizing the reclaimed sand with the binder solutions described in Example 1 as Resin A and Standard Resin 1, to provide Test A and Control A, respectively. Raw batch formulations and test cores were prepared as described above and the average tensile strength values for these test cores are reported below in Table 2, along with the percentage improvement observed in tensile strengths of dogbones made in accordance with the invention (i.e., Test A dogbones). The hour times reported in the table represent hours after the test cores were made.

TABLE 2

| | Solids Content of the Binder Solution | Tensiles (psi) | | | | Improvement in Tensiles % | | | |
|---|---|---|---|---|---|---|---|---|---|
| | | 1 hr | 2 hr | 4 hr | 24 hrs | 1 hr | 2 hr | 4 hr | 24 hrs |
| Control-A | 54 | 22 | 30 | 40 | 53 | — | — | — | — |
| Test-A | 42.5 | 23 | 42 | 52 | 63 | 4.5% | 40% | 30% | 18% |

The data in Table 2 show that the Text A binder solution, having a solids contents below conventional levels, i.e., below 45%, provided improved tensile strengths for test cores made from reclaimed sand.

EXAMPLE 5

Preparation of Test Cores with Pristine Sand

This example compares the tensile strength of test cores made using (1) a conventional binder solution and (2) a binder solution having a solids content below 45% with pristine sand.

Test cores were prepared in accordance with the method described in Example 4. The pristine sand used was washed and dried and had a particle size corresponding to an American Foundrymen Society's screen distribution of about 52 Grain Fineness.

The binder solutions used were those described in Example 1 as Resin A and the Standard Resin 1. They were used to provide Test B and Control B, respectively. The test cores did not contain any reclaimed sand and as such. This example does not illustrate the present invention, but is presented for purposes of comparison. Upon obtaining the raw batch formulations in accordance with the procedures of Example 4, test cores were made and tested as described in Example 4. The average tensile strength values calcuated from the observed values are reported in Table 3, with the percent changes (losses) in tensile strengths indicated for the test cores made utilizing the binder composition of the present invention.

TABLE 3

| | Solids Content of the Binder Solution | Tensiles (psi) | | | | Improvement in Tensiles % | | | |
|---|---|---|---|---|---|---|---|---|---|
| | | 1 hr | 2 hr | 4 hr | 24 hrs | 1 hr | 2 hr | 4 hr | 24 hrs |
| Control-2 | 54 | 55 | 75 | 95 | 123 | — | — | — | — |
| Test-B | 42.5 | 37 | 50 | 75 | 90 | −32% | −33% | −21% | −26% |

The data in Table 3 illustrate that lower solids contents in binder solutions of alkaline phenolic resin binders provide lower and less satisfactory tensile strengths for test cores produced from pristine sand.

EXAMPLE 6

Preparing Test Cores with an Alternate Reclaimed Sand

This example illustrates that the improvement in tensile strength obtained from the binder solutions of the present invention is not limited to a particular type of reclaimed sand.

Test cores were made utilizing the binder solutions described in Example 1 as Resin B, Resin C and Standard Resin 1 to provide Test C, Test D and Control -C, respectively. These test cores were prepared and tested as described in Example 4.

The reclaimed sand was recovered and reclaimed from foundry molds and cores used in casting metal from a different foundry than the reclaimed sand used in Example 4. The binder that had been used in making these molds and cores was an Alphaset 9000 alkaline phenolic resin cured with triacetin.

The sand was mechanically reclaimed from the foundry molds and cores at an American Foundrymen's Society screen size distribution of about 55.2 Grain Fineness. It had an LOI of 1.14.

The average values for the tensile strengths of the test cores made utilizing this reclaimed sand are shown below in Table 4.

TABLE 4

| | Solids Content of the Binder Solution | Tensiles (psi) | | | | Improvement in Tensiles % | | | |
|---|---|---|---|---|---|---|---|---|---|
| | | 1 hr | 2 hr | 4 hr | 24 hrs | 1 hr | 2 hr | 4 hr | 24 hrs |
| Control-C | 54 | 15 | 23 | 33 | 30 | — | — | — | — |
| Test-C | 45.6 | 20 | 27 | — | 49 | 30% | 17% | — | 63% |
| Test-D | 46 | 22 | 27 | 40 | 50 | 46% | 17% | 21% | 60% |

The data in Table 4 illustrate that improvements in tensile strength can be obtained with low solids content binder solutions with reclaimed sands from different sources.

EXAMPLE 7

Preparation of Test Cores with Reclaimed Sand/Pristine Sand Mixtures

Test cores were prepared with mixtures of reclaimed and pristine sand utilizing binder solutions at low solids contents and at conventional solids contents, to illustrate the advantages of this invention when working with a mixture of pristine sand and reclaimed sand.

Test cores were made utilizing the binder solution described in Example 1 as Resin B and Standard Resin 1 to provide Test E and Control D, respectively. The sand used was an 80:20 mixture of reclaimed:pristine sand. The pristine sand was washed and dried silica sand. These test cores were prepared and tested as described in Example 4.

The reclaimed sand was obtained from a foundry different from the source of the reclaimed sand described in Examples 4 and 6. The reclaimed sand was recovered from foundry molds and cores used in casting iron or steel. These foundry molds and cores contained a binder residue from an Alphaset 9000 resin binder that had been cured with triacetin, as described in Example 4.

The foundry molds or cores were dismantled after removal of the casting and shaken to remove loose sand particles. The sand was then mechanically reclaimed. The blend of pristine sand and reclaimed sand had a size distribution corresponding to an AFS screen distribution of about 39.56 Grain Fineness and had an LOI of 0.369.

The average values for the tensile strengths and the percentage improvements obtained by using the binder solutions of this invention are reported below in Table 5.

TABLE 5

| | Solids Content of the Binder Solution | Tensiles (psi) | | | | Improvement in Tensiles % | | | |
|---|---|---|---|---|---|---|---|---|---|
| | | 1 hr | 2 hr | 4 hr | 24 hrs | 1 hr | 2 hr | 4 hr | 24 hrs |
| Control-D | 54 | 19 | 27 | 35 | 39 | — | — | — | — |
| Test-E | 45.6 | 28 | 38 | 44 | 43 | 47% | 40% | 25% | 11% |

The data in Table 5 illustrate that binder solutions of the present invention provide improved tensile strengths for foundry cores or molds made from mixtures of reclaimed sand with pristine sand.

EXAMPLE 8

Test Cores Prepared by a Vapor Cure Method

Vapor cured test cores were prepared utilizing curable binder solutions at low solids contents and at more conventional solids contents, to illustrate that the advantages of the present invention can be realized with vapor cure methods.

To prepare the test cores, about 1500-2500 gms of reclaimed sand, as used in Example 4, were added to a Hobart Kitchen Aid Mixer. This reclaimed sand was brought to a temperature of about 25° C. Binder solutions described in Example 2 as Resin F and Standard Resin 2 were utilized in Test-F and Control-E, respectively. For Test-F, 1.8% by weight resin solution, based on the weight of sand, was added to the sand and mixed for 2 minutes. In Control-E, 1.5% by weight, based on the weight of sand, was added to the sand and mixed for 2 minutes.

When mixing was complete, the reclaimed sand/binder solution mixture was blown with a Redford Carver Core Blower (a tradename of Dependable Foundry Equipment Company, Sherwood, Oregon) using 80 psig air pressure for ½ second into a 3-cavity corebox, for producing Standard American Foundrymen Society's one-inch dogbone tensile briquettes. The corebox was then gassed for 5 seconds with methyl formate vapors generated in a CerJet Gas Generator (a trade name of Dependable Foundry Equipment, Sherwood, Oregon). Upon gassing, the cores cured under ambient conditions. Tensile strength measurements were made using a Dietert universal sand strength machine 400-1, fitted with a Tensile Core Strength Accessory 610-N.

Although the quantity of resin used in Test-F was greater than that of Control-E, the percent resin solids based on sand weight was higher for Control-E (0.855) than for Test-F (0.797).

The average values for the tensile strengths of the test cores made are indicated below in Table 6.

TABLE 6

| | Solids Content of the Binder Solution | Tensiles (psi) | | | | Improvement in Tensiles % | | | |
|---|---|---|---|---|---|---|---|---|---|
| | | 1 hr | 2 hr | 4 hr | 24 hrs | 1 hr | 2 hr | 4 hr | 24 hrs |
| Control-E | 57 | 23 | 22 | 26 | 35 | — | — | — | — |
| Test-F | 44.3 | 27 | 31 | 32 | 49 | 17.3% | 40% | 18% | 40% |

The improvement in tensile strength obtained from the low solids content binder solution indicates that the advantages of the present invention can be realized where reclaimed sand is utilized in a vapor cure manufacturing procedure.

EXAMPLE 9

Preparing Test Cores Utilizing Binder Solutions at Solids Contents Below 33% by Weight This example illustrates the lower limits for the solids content of binder solutions. A comparison is made of tensile strengths for test cores prepared from binder solutions of the present invention and those having lower solids contents, i.e., below about 33%.

Test cores were made utilizing the binder solutions described in Example 1 as Resin D, Resin E and Control Resin to provide Test G1, Test G and Control G, respectively. The raw batch formulations were prepared as described in Example 4 and cured with triacetin. The reclaimed sand used was as described in Example 4. Average values for tensile strength were obtained from 3-4 measured values and are reported in Table 7 below.

TABLE 7

| | Solids Content of the Binder Solution | Tensiles (psi) | | | | % Improvement in Tensiles | | | |
|---|---|---|---|---|---|---|---|---|---|
| | | 1 hr | 2 hr | 4 hr | 24 hrs | 1 hr | 2 hr | 4 hr | 24 hrs |
| Test-G1 | 41.3 | 20 | 27 | 30 | 45 | — | — | — | — |
| Test-G | 37.6 | 20 | 32 | 42 | 65 | — | 18.5% | 90% | 44.4% |
| Control-G | 30.2 | 13 | 15 | 25 | 32 | −35% | −44% | −16.6% | −28.8% |

The data in Table 7 illustrate that the use of binder solutions having solids contents as low as 30%-31% by weight have an adverse effect on tensile properties of test cores made with 100% reclaimed sand.

EXAMPLE 10

Preparing Test Cores With Low Solids Content Binder Solutions Made With Mixed Alkalis This example illustrates that the advantages of the present invention can be realized with binder solutions having resins condensed with a mixture of sodium and potassium alkalis. A comparison is made of tensile strengths for test cores prepared from a binder solution of the present invention and a binder at a more conventional solids content.

Test cores were prepared with the resins defined in Example 3 as Resin G and Control Resin 2 to provide Test H and Control H, respectively. The reclaimed sand was the same sand described in Example 4. These test cores were prepared and tested as described in Example 4. Average tensile strength values were obtained from 3 or 4 measurements and are reported in Table 8 below.

TABLE 8

| | Solids Content of the Binder Solution | Tensiles (psi) | | | | % Improvement in Tensiles | | | |
|---|---|---|---|---|---|---|---|---|---|
| | | 1 hr | 2 hr | 4 hr | 24 hrs | 1 hr | 2 hr | 4 hr | 24 hrs |
| Control-H | 51 | 20 | 22 | 20 | 15 | — | — | — | — |
| Test-H | 37.3 | 22 | 23 | 32 | 28 | 10% | 4% | 60% | 86% |

The data in Table 8 illustrate that improvements in tensile strength can be obtained wherein the phenolic resin binder is made with a mixture of sodium and potassium alkalis.

EXAMPLE 11

Preparation of Test Cores With a Two Component Binder Solution

This example demonstrates the use of a two component binder solution in forming test cores and the improvements in tensile strength obtained therefrom. The reclaimed sand was the same sand described in Example 4.

The two component binder solution in this example comprised (1) Standard Resin 1 and (2) an amount of dilution water added to the sand. The tensile strengths of the cores obtained were compared against test cores obtained from the use of Standard Resin 1 without added dilution water.

The test cores were prepared and tested as described in Example 4. About 1.5 weight percent Standard Resin 1 was added to the reclaimed sand for Control I and Test I. In Test I, 0.2 weight percent water, based on the initial weight of the reclaimed sand, was added to the reclaimed sand as a separate component.

Average tensile strength values were obtained from 3 or 4 measurements made for each Control and Test and they are reported below in Table 9.

TABLE 9

| | Solids Content of the Binder Solution | Tensiles (psi) | | | | % Improvement in Tensiles | | | |
|---|---|---|---|---|---|---|---|---|---|
| | | 1 hr | 2 hr | 4 hr | 24 hrs | 1 hr | 2 hr | 4 hr | 24 hrs |
| Control-I | 54 | 33 | 38 | 45 | 60 | — | — | — | — |
| Test-I | 46.5 | 40 | 53 | 65 | 72 | 21% | 39% | 44% | 20% |

The data in Table 9 show that improved tensile strengths can be obtained in test cores where the curable binder solution is comprised of two components and the solids content for the combined components falls below 50% by weight. While water was used as the second component and diluent in this example, it could as well be a silane solution that would be expected to result in a further, incremental improvement in tensile strength.

CONCLUSION

In the foregoing specification and in the examples, the binder has been an aqueous solution of an ester curable alkaline phenolic resin. Comparable results are obtainable where the binder is an acidic or neutral phenolic resin, and the curing agent and a source of alkalinity are added to the resin-sand mix either together or separately. The source of alkalinity must render the binder solution alkaline to make ester curing effective.

While the invention has been described in connection with specific embodiments thereof, it will be understood that it is capable of further modifications. This application is intended to cover any variations, uses or adaptations of the invention following, in general, the principles of this invention and including such departures from the present disclosures as come within known and customary practice within the art to which the invention pertains.

What is claimed:

1. A method for producing a shaped article of a resin-bonded sand, wherein at least 40% of the sand in said article is reclaimed sand, said method comprising combining;
   (a) sand of which at least 40% by weight is reclaimed sand,
   (b) an aqueous solution of an alkaline phenolic resin that is curable at ambient temperature by a curing agent having ester functionality, and wherein said solution has a solids content in the range of about 33% to about 47% by weight, and,
   (c) a curing agent having ester functionality that can cause said resin to cure at ambient temperature; and shaping, and permitting said shape to cure;
   wherein said reclaimed sand contains an alkaline resin binder residue, said residue being left on the surfaces of the reclaimed sand after being previously bonded in a shape by an ester cured alkaline phenolic resin and recovered from said shape in the form of free-flowing sand granules.

2. A method in accordance with claim 1 wherein said resin solution comprises an aqueous solution of an alkaline phenol formaldehyde resin wherein
   (i) the weight average molecular weight (Mw) is from 500 to 2500,
   (ii) the formaldehyde:phenol molar ratio is from 1:1 to 3:1,
   (iii) the alkali:phenol molar ratio is from 0.2:1 to 1.2:1,
   (iv) the alkali used comprises sodium hydroxide, potassium hydroxide, or their mixtures,
   (v) said solution may optionally contain a silane to the extent of 0.05% to 3.0% by weight of said aqueous resin solution, and
   (vi) said resin is curable at ambient temperature with $C_1$–$C_3$ alkyl formates, organic esters formed from $C_1$ to $C_{10}$ carboxylic acids and mono- and polyhydric alcohols, and low molecular weight lactones.

3. A method for producing a shaped article of a resin-bonded sand, wherein at least 50% of the sand in said article is reclaimed sand, said method comprising combining (a) said of which at least 50% by weight is reclaimed used sand having on its surfaces residual material from being previously bonded in a shape by an ester cured alkaline phenolic resin and mechanically recovered from said shape in the form of free-flowing sand granules, (b) a solution of an alkaline phenolic resin that has a solids content in the range from about 35% to about 45% by weight, and that is further characterized in that:

(i) the weight average molecular weight (Mw) is from 700 to 2000, (ii) the formaldehyde:phenol molar ratio is from 1.2:1 to 2.6:1, (iii) the alkali:phenol molar ratio is from 0.6:1 to 1.2:1, (iv) the alkali used comprises sodium hydroxide, potassium hydroxide, or their mixtures, (v) said solution may optionally contain a silane to the extent of 0.5% to 3.0% by weight of said aqueous resin solution, and (vi) said resin is curable at ambient temperature with $C_1$–$C_3$ alkyl formates, organic esters formed from $C_1$ to $C_{10}$ carboxylic acids and mono- and polyhydric alcohols, and low molecular weight lactones selected from the group consisting of butyrolactone, propiolactone, caprolactone, and mixtures thereof, (c) a curing agent having ester functionality that can cause said resin to cure at ambient temperature; and shaping, and permitting said shape to cure.

4. A method for producing a shaped article of a resin-bonded sand, for use in casting molten metal where the molten metal makes contact with said shaped article, wherein from 40% to 100% of the sand in said article is reclaimed sand, said method comprising mixing together;

(a) sand of which at least 40% by weight is reclaimed sand, (b) an aqueous solution of an alkaline phenolic resin that is curable at ambient temperature by a curing agent having ester functionality, and wherein said solution has a solids content in the range of from about 33% to about 47% by weight, and;

(c) a curing agent having ester functionality that can cause said resin to cure at ambient temperature; and shaping said mixture, then permitting said mixture to cure while retaining its shape;

wherein said reclaimed sand contains an alkaline resin binder residue, said residue being left on the surfaces of the reclaimed sand after being previously bonded in a shape by an ester cured alkaline phenolic resin and recovered from said shape in the form of free-flowing sand granules.

5. A method according to claim 4 wherein the resin in said alkaline phenolic resin solution is further characterized as follows:

(i) the weight average molecular weight (Mw) is from 500 to 2500, (ii) the formaldehyde:phenol molar ratio is from 1:1 to 3:1, (iii) the alkali:phenol molar ratio is from 0.2:1 to 1.2:1, (iv) the alkali used comprises sodium hydroxide, potassium hydroxide, or their mixtures, (v) said solution may optionally contain a silane to the extent of 0.05% to 3.0% by weight of said aqueous resin solution, and (vi) said resin is curable at ambient temperature with $C_1$–$C_3$ alkyl formates, organic esters formed from $C_1$ to $C_{10}$ carboxylic acids and mono- and polyhydric alcohols, and low molecular weight lactones selected from the group consisting of butyrolactone, propiolactone, caprolactone, and mixtures thereof.

6. A process according to claim 4 wherein at least 50% of the sand in said article is reclaimed sand.

7. A method according to claim 4 wherein said resin solution has a solids content in the range from about 35% to about 45% by weight.

8. A method according to claim 4 wherein said sand has on its surfaces residual material from being previously bonded in a shape by an ester cured alkaline phenolic resin.

9. A method according to claim 4 wherein said sand is characterized by residual alkalinity.

10. A method according to claim 4 wherein said reclaimed used sand has on its said surfaces a water-removable residue.

11. A method according to claim 8 wherein said reclaimed used sand has on its said surfaces residual material comprising alkaline silicate material.

12. A method according to claim 8 wherein said resin solution comprises an aqueous solution of an alkaline phenol formaldehyde resin wherein (i) the weight average molecular weight (Mw) is from 700 to 2000, (ii) the formaldehyde:phenol molar ratio is from 1.2:1 to 2.6:1, (iii) the alkali:phenol molar ratio is from 0.61 to 1.2:1, (iv) the alkali used comprises sodium hydroxide, potassium hydroxide, or their mixtures, (v) said solution may optionally contain a silane to the extent of 0.5% to 3.0% by weight of said aqueous resin solution, and (vi) said resin is curable at ambient temperature with $C_1$–$C_3$ alkyl formates, organic esters formed from $C_1$ to $C_{10}$ carboxylic acids and mono- and polyhydric alcohols, and low molecular weight lactones including butyrolactone, propiolactone, caprolactone, and mixtures thereof, (c) a curing agent having ester functionality that can cause said resin to cure at ambient temperature; and shaping, and permitting said shape to cure.

13. A method for producing a shaped article of a resin-bonded sand, wherein at least 60% of the sand in said article is reclaimed sand, comprising mixing together (a) sand of which at least 60% by weight is reclaimed sand that has been reclaimed from other resin-bonded sand articles wherein the resin bond was formed from an ester cured alkaline phenolic resin, (b) an aqueous solution of an alkaline phenolic resin that has a solids content in the range from about 35% to about 45% by weight, and that is further characterized as follows:

(i) the weight average molecular weight (Mw) is from 800 to 1700;

(ii) the formaldehyde:phenol molar ratio is from 1.2:1 to 2.6:1;

(iii) the alkali:phenol molar ratio is from 0.6:1 to 1.2:1;

(iv) the alkali used comprises sodium hydroxide, potassium hydroxide, or their mixtures;

(v) said solution may optionally contain a silane to the extent of 0.5% to 3.0% by weight of said aqueous resin solution, and;

(vi) said resin is curable at ambient temperature with $C_1$–$C_3$ alkyl formates, organic esters formed from $C_1$ to $C_{10}$ carboxylic acids and mono- and polyhydric alcohols, and low molecular weight lactones selected from the group consisting of butyrolactone, propiolactone, caprolactone, and mixtures thereof;

(c) a curing agent having ester functionality that can cause said resin to cure at ambient temperature; and shaping said mixture, then permitting said mixture to cure while retaining its shape;

wherein said reclaimed sand contains an alkaline resin binder residue, said residue being left on the surfaces of the reclaimed sand after being previously bonded in a shape by an ester cured alkaline phenolic resin and mechanically recovered from said shape in the form of free-flowing sand granules.

14. A method for producing a shaped article of a resin-bonded sand, wherein at least 40% of the sand in said article is reclaimed sand, comprising combining;
   (a) sand of which at least 40% by weight is reclaimed sand,
   (b) an aqueous solution of an alkaline phenolic resin that is curable at ambient temperature by a curing agent having ester functionality, and wherein said solution has a solids content in the range of about 50% to 75% by weight,
   (c) sufficient dilutent solvent to have the effect if combined with said resin solution, of reducing the solids content of said solution to be within the range from about 33% to about 47% by weight, and;
   (d) a curing agent having ester functionality that can cause said resin to cure at ambient temperature; and wherein said reclaimed sand contains an alkaline resin binder residue, said residue being left on the surfaces of the reclaimed sand after being previously bonded in a shape by an ester cured alkaline phenolic resin and mechanically recovered from said shape in the form of free-flowing sand granules.

15. A method according to claim 14 wherein the resin of said alkaline resin solution (b) is further characterized as follows:
   (i) the weight average molecular weight (Mw) is from 500 to 2500,
   (ii) the formaldehyde:phenol molar ratio is from 1:1 to 3:1,
   (iii) the alkali:phenol molar ratio is from 0.2:1 to 1.2:1,
   (iv) the alkali used comprises sodium hydroxide, potassium hydroxide, or their mixtures,
   (v) said solution may optionally contain a silane to the extent of 0.05% to 3.0% by weight of said aqueous resin solution, and
   (vi) said resin is curable at ambient temperature with $C_1$–$C_3$ alkyl formates, organic esters formed from $C_1$ to $C_{10}$ carboxylic acids and mono- and polyhydric alcohols, and low molecular weight lactones selected from the group consisting of butyrolactone, propiolactone, caprolactone, and mixture thereof.

16. A method according to claim 14 wherein at least 50% of the sand in said article is reclaimed sand.

17. A method according to claim 14 wherein the amount of diluent solvent is sufficient to have the effect, if combined with said resin solution, of reducing the solids content of said solution to be within the range from about 35% to about 45% by weight.

18. A method according to claim 14 wherein said reclaimed sand is characterized by residual alkalinity.

19. A method according to claim 14 wherein said reclaimed sand has on its said surfaces residual material comprising a water-removable residue.

20. A method according to claim 14 wherein said reclaimed sand has on its said surfaces residual material comprising alkaline silicate material.

21. A method according to claim 15 wherein the resin of said alkaline resin solution (b) is further characterized as follows:
   (i) the weight average molecular weight (Mw) is from 700 to 2000,
   (ii) the formaldehyde:phenol molar ratio is from 1.2:1 to 2.6:1,
   (iii) the alkali:phenol molar ratio is from 0.6:1 to 1.2:1,
   (iv) the alkali used comprises sodium hydroxide, potassium hydroxide, or their mixtures,
   (v) said solution may optionally contain a silane to the extent of 0.5% to 3.0% by weight of said aqueous resin solution, and
   (vi) said resin is curable at ambient temperature with $C_1$–$C_3$ alkyl formates, organic esters formed from $C_1$ to $C_{10}$ carboxylic acids and mono- and polyhydric alcohols, and low molecular weight lactones selected from the group consisting of butyrolactone, propiolactone, caprolactone, and mixtures thereof,
   (c) a curing agent having ester functionality that can cause said resin to cure at ambient temperature; and shaping, and permitting said shape to cure.

22. A method for producing a shaped article of a resin-bonded sand, wherein at least 50% of the sand in said article is reclaimed sand, comprising combining;
   (a) sand of which at least 50% by weight is reclaimed sand, having on its surfaces a residual material from being previously bonded in a shape by an ester cured alkaline phenolic resin and mechanically recovered from said shape in the form of free-flowing granules,
   (b) an aqueous solution of an alkaline phenolic resin that has a solids content in the range from about 50% to about 75% by weight, said alkaline phenolic resin being characterized as follows;
      (i) the weight average molecular weight (Mw) is from 700 to 2000;
      (ii) the formaldehyde:phenol molar ratio is from 1:1 to 3:1;
      (iii) the alkali:phenol molar ratio is from 0.2:1 to 1.2:1;
      (iv) the alkali used comprises sodium hydroxide, potassium hydroxide, or their mixtures;
      (v) said solution may optionally contain a silane to the extent of 0.5% to 3.0% by weight of said aqueous resin solution, and;
      (vi) said resin is curable at ambient temperature with $C_1$–$C_3$ alkyl formates, organic esters formed from $C_1$ to $C_{10}$ carboxylic acids and mono- and polyhydric alcohols, and low molecular weight lactones selected from the group consisting of butyrolactone, propiolactone, caprolactone, and mixtures thereof;
   (c) sufficient diluent solvent to have the effect, if combined with said resin solution, of reducing the solids content of said resin solution to be within the range from about 35% to about 45% by weight, and;
   (d) a curing agent having ester functionality that can cause said resin to cure at ambient temperature; and shaping, then permitting said shape to cure.

23. A method for producing a shaped article of a resin-bonded sand, wherein from 40% to 100% of the sand in said article is reclaimed sand, comprising mixing together:
   (a) sand of which at least 40% by weight is reclaimed sand having on its surfaces residual material from being previously bonded in a shape by an ester cured alkaline phenolic resin and mechanically recovered from said shape in the form of free-flowing sand granules,
   (b) an aqueous solution of an alkaline phenolic resin that has a solids content in the range from about 50% to 75% by weight, and
   (c) sufficient dilutent solvent to have the effect, if combined with said resin solution, of reducing the solids content of said solution to be within the range from about 33% to about 47% by weight, and
   (d) a curing agent having ester functionality that can cause said resin to cure at ambient temperature; and shaping said mixture, then permitting said mixture to cure while retaining its shape.

24. A method according to claim 22 wherein at least 50% of the sand in said article is reclaimed sand, and the amount of diluent solvent is sufficient to have the effect, if combined with said resin solution, of reducing the solids content of said solution to be within the range from about 35% to about 45% by weight.

25. A method according to claim 23 wherein the alkaline phenolic resin in said solution is further characterized as follows:
   (i) the weight average molecular weight (Mw) is from 700 to 2000,
   (ii) the formaldehyde:phenol molar ratio is from 1:1 to 3:1,
   (iii) the alkali:phenol molar ratio is from 0.2:1 to 1.2:1,
   (iv) the alkali used comprises sodium hydroxide, potassium hydroxide, or their mixtures,
   (v) said solution may optionally contain a silane to the extent of 0.05% to 3.0% by weight of said aqueous resin solution, and
   (vi) said resin is curable at room temperature with $C_1$–$C_3$ alkyl formates, organic esters formed from $C_1$ to $C_{10}$ carboxylic acids and mono- and polyhydric alcohols, and low molecular weight lactones selected from the group consisting of butyrolactone, propiolactone, caprolactone, and mixtures thereof.

26. A method according to claim 25 wherein the alkaline phenolic resin in said solution is further characterized in that:
   (i) the formaldehyde:phenol molar ratio is from 1.2:1 to 2.6:1,
   (ii) the alkali:phenol molar ratio is from 0.6:1 to 1.2:1.

27. A method according to claim 23 wherein said reclaimed sand is characterized by residual alkalinity.

28. A method according to claim 23 wherein said sand has on its said surfaces residual material comprising a water-removable residue.

29. A method according to claim 23 wherein said sand has on its said surfaces residual material comprising alkaline silicate material.

30. A method for producing sand aggregates from sand and a curable binder wherein at least 40% by weight of said sand is reclaimed sand from dismantled foundry molds or cores following use in a metal casting process, said method comprising
   (a) forming a raw batch formulation which comprises
      (i) sand
      (ii) a binder solution in sufficient quantity when cured to bind said sand with the adhesion necessary for foundry molds and cores, said binder solution having a solids content within the range of about 33% to about 47% by weight and comprising an alkaline phenolic resin and
      (iii) a curing agent effective for curing said binder at ambient temperature in an amount sufficient to affect curing of said binder under curing conditions,
   (b) providing said raw batch formulation in a desired shape and
   (c) allowing the binder solution to cure said raw batch formulation under curing conditions,
   wherein at least 40% by weight of said sand is reclaimed from dismantled foundry molds or cores following use in a metal casting process, said dismantled foundry cores or molds from which the reclaimed sand is obtained is made with a cured binder of an ester cured alkaline phenolic resin;
   wherein said reclaimed sand contains an alkaline resin binder residue, said residue being left on the surfaces of the reclaimed sand after being previously bonded in a shape by an ester cured alkaline phenolic resin and recovered from said shape in the form of free-flowing sand granules.

31. A method as in claim 30 wherein
   (a) the curing agent for said curable binder solution is selected from the group consisting of $C_1$–$C_3$ alkyl formates, organic esters formed from $C_1$ to $C_{10}$ carboxylic acids and mono- and polyhydric alcohols, and low molecular weight lactones, and
   (b) the alkaline phenolic resin of the binder solution is the reaction product of a phenol and formaldehyde at a phenol:formaldehyde molar ratio within the range of about 1:1 to about 1:3 condensed with an alkali comprising potassium hydroxide, sodium hydroxide, lithium hydroxide or mixtures thereof, and
   (c) the alkali:phenol molar ratio is 0.2:1 to 1.2:1.

32. A method as in claim 30 wherein said cured binder in the foundry cores and molds from which the sand is obtained is
   (a) cured at ambient temperature with a curing agent selected from the group consisting of $C_1$–$C_3$ alkyl formates, organic esters formed from $C_1$ to $C_{10}$ carboxylic acids and mono- and polyhydric alcohols, and low molecular weight lactones, and
   (b) an ester cured alkaline phenol formaldehyde resin which is the reaction product of a phenol and formaldehyde at a phenol formaldehyde molar ratio within the range of about 1:1 to 1:3 condensed with an alkali comprising potassium hydroxide, sodium hydroxide, lithium hydroxide or mixtures thereof.

33. A method as in claim 30 wherein said curable binder solution comprises a silane in an amount sufficient to increase the tensile strength of the sand aggregate produced from said raw batch formulation.

34. A method as in claim 30 wherein the curable binder solution comprises the two separate components
   (1) a solution of alkaline phenolic resin,
   (2) a solvent for said alkaline phenolic resin, wherein the components are separately added and mixed with the sand, and the solids content for these components, if combined, falls within the range from about 33% to about 47% by weight, based on the total weight of said two components.

35. A method as in claim 34 wherein said alkaline phenolic resin solution component has a solids content above 50% by weight.

36. A method for producing foundry molds or cores from said of which from 50% to 100% by weight is reclaimed sand from dismantled foundry molds or cores following their use in a metal casting process, said method comprising
   (a) forming a raw batch formulation which comprises
   (i) sand,
   (ii) 0.5% to 8% by weight, based on the weight of sand, of a binder solution having a solids content with the range of about 33% to about 47% by weight, said binder solution comprising an aqueous solution of a potassium alkali phenol formaldehyde resin obtained by the reaction of phenol and formaldehyde at a phenol:formaldehyde molar ratio within the range of about 1:1 to 1:3.0 and wherein said resin has a potassium hydroxide:phenol molar ratio within the range of about 0.2:1 to 1.2:1,
   wherein said binder solution contains an amount of silane effective in increasing the tensile strength of the foundry molds or cores produced from said sand and
   (iii) a curing agent that is effective for curing said binder and in an amount of about 10% to 110%, based on the weight of said binder solution, and selected from the group consisting of $C_1$-$C_3$ alkyl formates, organic esters formed from $C_1$ to $C_{10}$ carboxylic acids and mono- and polyhydric alcohols, and low molecular weight lactones,
   (b) shaping said raw batch formulation to the form desired and
   (c) allowing the binder in said shaped raw batch formulation to cure under ambient conditions,
   (1) wherein 50% to 100% by weight of said sand is reclaimed sand from one or more dismantled foundry molds or cores following use in a metal casting process to provide sand granules having a size corresponding to an American Foundrymen's Society's screen distribution in the range of 25 to 140 Grain Fineness, said foundry molds or cores from which said reclaimed sand is obtained being made with a cured binder resin that is
   (a) derived from a potassium alkali phenol formaldehyde resin which is the reaction product of phenol and formaldehyde at a phenol:formaldehyde molar ratio within the range of about 1:1 to 1:3.0, wherein said resin has a potassium hydroxide phenol molar ratio within the range of about 0.2:1 to 1.2:1 and
   (b) which contains an amount of silane effective in increasing the tensile strength of the foundry cure or mold from which the reclaimed sand are obtained and
   (c) which has been cured at ambient temperature with a curing agent selected from a group consisting of $C_1$-$C_3$ alkyl formates, organic esters formed from $C_1$ to $C_{10}$ carboxylic acids and mono- and polyhydric alcohols, and low molecular weight lactones;
   wherein said reclaimed sand contains an alkaline resin binder residue, said residue being left on the surfaces of the reclaimed sand after being previously bonded in a shape by an ester cured alkaline phenolic resin and recovered from said shape in the form of free-flowing sand granules.

37. A method for producing foundry molds or cores from sand of which 50% to 100% by weight is reclaimed sand from dismantled foundry molds or cores following use in a metal casting process, said method comprising
   (a) forming a mixture comprised of
   (i) sand, and
   (ii) 0.5% to 8% by weight, based on the weight of sand, of a binder having a solids content within the range of about 33% to about 47% by weight, said binder comprising an aqueous solution of a potassium alkali phenol formaldehyde resin obtained by the reaction of phenol and formaldehyde at a phenol:formaldehyde molar and polyhydric alcohols, and low molecular weight lactones;
   wherein said reclaimed sand contains an alkaline resin binder residue, said residue being left on the surfaces of the reclaimed sand after being previously bonded in a shape by an ester cured alkaline phenolic resin and recovered from said shape in the form of free-flowing sand granules.

* * * * *